Patented Mar. 1, 1932

1,847,624

UNITED STATES PATENT OFFICE

RALPH C. POLLOCK, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

METHOD OF REVIVIFYING CLAYS

No Drawing. Application filed August 10, 1929. Serial No. 385,062.

This invention refers to a process for recovering clays which have been used in decolorizing oils. It has become usual in treatment of lubricating oils to treat the acid-treated oil with clay to obtain the desired color for the oil. Sometimes the clay is used both as a neutralizing medium and as a decolorizing medium. Clay is also used in the treatment of gasolines, kerosenes and other light oils, simultaneously with or subsequent to acid treatment to obtain the required color.

I have found that if the used clay is calcined at an elevated temperature in the neighborhood of 1200° F., the clay can be used again. However, the limit is soon reached when the calcination of the used clay does not revivify it. In other words, there is a limit to the number of times the clay can be calcined and reused.

I have discovered that the deleterious product in the clay, which limits the number of re-calcinations and revivifications, is the acid sludge which the clay has adsorbed when it was used to treat acid treated oils. These acid treated oils contain suspended sludge particles which are adsorbed by the clay.

I have found that if these acid sludge constituents are substantially entirely removed the clay can be used over and over again, practically without limit, the only limitation being the gradual loss of clay due to solution and mechanical handling of the clay.

It is, therefore, an object of my invention to so treat clay which has been used in treating oils containing acid sludge that the separated clay is freed of adsorbed acid sludge constituents before calcination.

I have found that by washing the clay with sufficient quantities of hot or cold water, by intimately commingling the clay and the water, substantially all of the acid sludge can be removed from the clay so that on subsequent calcination the clay is restored to its original, and even improved efficiency. The water wash removes more than merely the inorganic acid which the clay adsorbs on treating the acid treated oil, it also removes the reaction products of the acid with the oil, namely the acid sludge which is adsorbed by the clay. The water wash also removes reaction products of the acid and certain constituents of the clay which on ignition form poisons decreasing the adsorptive efficiency of the clay.

As a particular illustration of the manner in which I may carry out my invention, acid oil, for instance, gasoline which has been acid treated and which contains acid sludge particles, is treated with decolorizing clay which will both decolorize the gasoline and remove the acid sludge particles. This clay can be revivified by simple ignition and used again, and perhaps revivified and used a second time. But it cannot be revivified many more times without completely destroying its efficiency. However, it this clay is de-oiled by heating to a simmering temperature, i. e. 205–212° F. and the oil floated off and the clay washed thoroughly, by violent agitation or boiling, to remove substantially all of the acid sludge in the clay before it is calcined or ignited it can then be re-calcined and reused many more times than if this intermediate sludge removal stage is not employed. The de-oiling, and washing of the clay can be combined into one continuous process by first adding the necessary amount of water, either hot or cold, i. e. about five times the weight of the dry clay, heating the mixture to a simmering temperature, skimming off the oil which has thus been caused to rise to the surface and then after the greater part of the oil has been removed, completing the washing by boiling the mixture strongly for about ten minutes. The clay can then be settled or filtered.

The washed clay is then dried and ignited at about 1200° F. until free from visible carbon.

The removal of acid sludge can also be accomplished by placing the clay which has been used in decolorizing gasoline or kerosene in the presence of acid sludge in the basket of a centrifuge, centrifuging the clay to remove the oil, and, after most of the oil has been removed, spraying the centrifuge cake with hot or cold water until the clay is substantially free of acid sludge. The centrifuging is then continued to remove as much water as possible. A filter may be used in place of the centrifuge and the wash water passed through the cake.

The de-oiled and washed clay is then dried and ignited as described above.

The above description is not to be taken as limiting my invention, but is merely illustrative of the best method of carrying it out. As will be understood by those skilled in the art, many modifications can be made within the spirit of my invention which I claim to be.

I claim:

A process of revivifying clay containing adsorbed acid sludge resulting from the treating of oils which have been themselves treated with acid, which comprises washing the clay with water in sufficient quantities to remove substantially all the acid sludge and other acid reaction products from the clay, and drying and calcining the clay to revivify the same.

Signed at Wilmington, in the county of Los Angeles, and State of California, this 27th day of July, A. D. 1929.

RALPH C. POLLOCK.